(12) United States Patent
Bartoshesky et al.

(10) Patent No.: US 11,650,165 B2
(45) Date of Patent: May 16, 2023

(54) OPERATOR GUIDED INSPECTION DEVICE, SYSTEM, AND METHOD

(71) Applicants: Thomas Alton Bartoshesky, Ann Arbor, MI (US); Jonathan Douglas Williams, Farmington Hills, MI (US); Robert Fuelep Biro, San Jose, CA (US)

(72) Inventors: Thomas Alton Bartoshesky, Ann Arbor, MI (US); Jonathan Douglas Williams, Farmington Hills, MI (US); Robert Fuelep Biro, San Jose, CA (US)

(73) Assignee: Verify Technologies LLC, Ann Arbor, MI (US)

( * ) Notice: Subject to any disclaimer, the term of this patent is extended or adjusted under 35 U.S.C. 154(b) by 128 days.

(21) Appl. No.: 17/114,979

(22) Filed: Dec. 8, 2020

(65) Prior Publication Data
US 2022/0178836 A1 Jun. 9, 2022

(51) Int. Cl.
*G01N 21/88* (2006.01)
*G01N 21/89* (2006.01)

(52) U.S. Cl.
CPC ..... *G01N 21/8806* (2013.01); *G01N 21/8901* (2013.01); *G01N 2021/8816* (2013.01)

(58) Field of Classification Search
CPC ....... G01N 2021/8816; G01N 21/8806; G01N 21/8901; G02B 2027/0178; G02B 27/0172
USPC ...... 356/237.1–237.6, 239.1–239.8
See application file for complete search history.

(56) References Cited

U.S. PATENT DOCUMENTS 8,907,260 B2 * 12/2014 Restaino ................ G06V 10/89
250/201.9

* cited by examiner

*Primary Examiner* — Tri T Ton
(74) *Attorney, Agent, or Firm* — Heed Law Group PLLC; Thomas P. Heed

(57) ABSTRACT

A device, system, and method related to operator guided inspection is disclosed. A portable inspection device ("PID") is comprised of a housing, display, camera, light array, gyro, location sensor, a non-transitory computer-readable medium, a processor, and a computer-executable instruction set stored on the non-transitory computer-readable medium. The method is comprised of the steps of selecting an inspection task using the PID; capturing an image of the DUT; providing a reference image with reference dimensions; fixing the focal distance on the camera; providing a region of interest ("ROI") and an alignment region ("AR") on the display of the PID; adjusting the lighting of the PID to match the illumination on the DUT with the illumination in the reference image; adjusting the distance between the PID and the DUT such that the DUT fits in the ROI; rotating the PID until the ROI and AR merge into a Merged Region; calibrating the Merged Region with the reference image by scaling the pixel-level distances of the Merged Region with the reference dimensions of the reference image; and performing an automated inspection routine on one or more special characteristics of the DUT. The operator guided inspection system ("OGIS") includes a plurality of PIDs capable of measuring a plurality of DUTs.

25 Claims, 9 Drawing Sheets

OPERATOR GUIDED INSPECTION DEVICE, SYSTEM, AND METHOD

FIELD OF INVENTION

The present invention relates to the classification for methods or arrangements for reading or recognising printed or written characters or for recognising patterns; and to one or more sub-classifications for image acquisition and image analysis. Specifically, the present invention is an operator guided inspection systems.

BACKGROUND OF INVENTION

The statements in this section merely provide background information related to the present disclosure. Accordingly, such statements are not intended to constitute an admission of prior art.

Currently, machine vision inspection systems are utilized to verify correct part installation. For example, a machine vision system can verify that every expected part is included and installed within proper tolerances.

As the technology progresses, flaws in the current state of the art are becoming apparent. With hand-held inspection devices ("HID"), real-time, computerized inspection is available in almost any environment. Ideally, complex devices, such as aircraft, automobiles, and Magnetic Resonance Imaging ("MRI") machines can have their assembly inspected in real-time, in situ, with the go/no-go decision for each special characteristic being made by the machine rather than a human. A special characteristic is a product characteristic or process parameter which can affect safety or compliance with regulations, fit, function, performance or subsequent processing of product. Missing parts, faulty connector installation, and out-of-tolerance assemblies can theoretically be eliminated. Unfortunately, such an idealized HID carries with it many technological hurdles.

For example, the relative location of the HID with respect to the device under test ("DUT") becomes a critical. The HID must be able to instruct the operator in correct location, meaning the correct spatial distance between the HID and DUT. Additionally, the HID must be able to instruct the operator on the correct orientation between the HID and DUT. The correct orientation requires the real-time alignment of the HID to the DUT with respect to three axes of rotation. Providing such real-time instruction to an operator, in an intuitive, understandable, and actionable fashion, is difficult, and it is something that the prior art has failed to adequately teach.

Environmental conditions add additional problems. Image capture and analysis can be negatively affected by the ambient lighting, the background, vibration, haze, and motion. Controlling or eliminating for these effects are difficult.

What the market needs is a HID that intuitively instructs the operator on the correct location and spatial orientation, while minimizing the negative effects of variable lighting, background variation, vibration, motion, and other effects.

SUMMARY OF THE INVENTION

This summary is intended to disclose the present invention, an operator guided inspection device, system, and method. The embodiment and description are used to illustrate the invention and its utility and are not intended to limit the invention or its use. The following presents a simplified summary of the primary embodiment of the invention to provide a basic understanding of the invention. Additional concepts that can be added or varied with the primary embodiment are also disclosed. The present invention is novel with respect to the prior art, can be distinguished from the prior art, and meets an unmet market need. This disclosure discusses a portable inspection device ("PID"), a method employing the PID, and a system employing the PID.

The PID is comprised of a housing, alternatively called a case; a light array; at least one camera; a display; a power supply; a light sensor; a processor; a non-transitory computer-readable memory element; wireless communication circuitry; and a computer-readable instruction set, stored in the non-transitory memory. The processor is capable of executing the computer-readable instruction set. Optionally, the PID may contain a gyro. The light array is comprised of a plurality of lighting elements, for example light emitting diodes ("LEDs"). The lighting elements of the light array can be separately energized based off of feedback that the light sensor gives the processor, when the computer-readable instruction set is executed. The location and frequency (color) of the lighting elements in the light array can be used to optimize features of the DUT. In an alternatively embodiment, the display is housed in goggles as a heads-up display.

The PID communicates and exchanges data with an operator guided inspection system ("OGIS"). The PID communicates with the OGIS via wireless communication circuitry such as a cellular network access device, WiFi, or Blue-Tooth chipset. The PID exchanges data with the OGIS, such as sign-in credentials, inspection sequence, and requests for reference images and metadata. Metadata is known within the art. Metadata is a set of data that describes and gives information about other data. The metadata may include information such as reference tolerances based off of a part number, lighting parameters, and special characteristics.

The computer-readable instruction set performs a set of functions on the PID and is the primary method of this application. The computer-readable instruction set has the operator sign-in and then transmits the credentials to the OGIS. The computer-readable instruction set identifies the part number or part numbers to be inspected. The computer-readable instruction set identifies the part number or part numbers to be inspected based off of at least one of the following: a bar-code scan of a part number, optical character recognition, prompted input from the operator, or a sequence provided to the OGIS by an enterprise resource planning program that controls the part numbers to be produced. The computer-readable instruction set requests a reference image and metadata from the OGIS, using the part number or part numbers, via the wireless communication circuitry. The computer-readable instruction set receives the reference image and reference tolerance from the OGIS and projects an image of the same on the display of the PID. The computer-readable instruction set fixes the focal length of the camera based off of metadata related to the part number.

The computer-readable instruction set projects a Region of Interest ("ROI") on the display of the PID. The ROI is typically a plane shape, such as a rectangle. The computer-readable instruction set projects an Alignment Region ("AR") on the display of the PID. The AR is typically a plane shape, such as a rectangle, separate and apart from the ROI.

The operator identifies a Device Under Test ("DUT") and aligns the camera of the PID to project the DUT onto the display of the PID. The computer-readable instruction set measures the light on the DUT using the light sensor, compares it to the reference image and/or the metadata lighting parameters, and adjusts the lighting on the DUT to match the illumination on the reference image by individually selecting and powering one or more LEDs from the light array of the PID. The computer-readable instruction set performs live image capturing by maintaining a real-time image of the DUT on the display of the PID. The fixed focal length of the camera forces the operator to position the PID at the correct distanced from the DUT, such that the DUT is within the ROI. The operator rotates the PID until the AR merges with the ROI ("Merged Region"). With the DUT within the Merged Region, the computer-readable instruction set calibrates the image of the DUT within the Merged Region with the reference image by scaling the pixel-level distances measured from the DUT with the real-world dimensions associated in the metadata of the reference image. The computer-readable instruction set then scales the pixel-level distances to their appropriate real-world dimensions. There is of course the possibility of changing the order of some of the foregoing steps, or iterating on them.

The camera in the PID used to capture the image uses at least one of the spectra of visible light, x-ray, and infrared. The spectrum can be analyzed by hyperspectral imaging. The spectrum can be imaged into two-dimensions or three dimensions. A three-dimensional image can be created using at least one of time-of-flight, structured lighting, stereo, radar, and lidar.

The computer-readable instruction set performs an automated routine on one or more special characteristics of the DUT visible within the Merged Region, once the above conditions are met. A special characteristic is a dimension or condition which is considered critical for the manufacturing process, and which lends itself to measurement. For example, the distance between the edge of a connector and a tab on the mating terminal for the connector may be considered a special characteristic that defines whether or not the connector is properly seated on the terminal. By measuring the calibrated distance between the tab and the edge of the connector, the computer-readable instruction set can assess whether or not the special characteristic is within a pre-defined tolerance. Based on this, the computer-readable instruction set either passes or rejects the part. The process is repeated for additional special characteristics of the DUT visible within the Merged Region until all special characteristics visible are inspected.

The computer-readable instruction set can then be incremented to show another view of the DUT, or a different DUT ("DUT-N"). N is an integer number of DUTs that are measured by an OGIS. A single PID may measure one or more DUTs. The OGIS interoperates with a plurality of PIDS, X, wherein X is an integer number of PIDs associated with an OGIS. N and X may be different integers. N is greater than or equal to X. The computer-readable instruction set on an individual PID can be made to measure multiple special characteristics for each of multiple views of a single DUT and then perform similar operations on additional DUTs included in the same assembly, such as an automobile. The OGIS may use separate PIDs to inspect additional DUTs, properly assigning PIDs to DUTs, so that all possible DUT-N in an assembly are inspected by the X number of PIDs ("PID-X"), with each PID-X inspecting one or more DUT-N. Clearly, a plurality of operators numbering X is required to use the X number of PIDs, where an operator is defined as a person using a PID to inspect a DUT.

In one alternative embodiment, the PID further comprises a gyro, and the gyro gives haptic feedback to the operator to align the ROI and AR In another alternative embodiment, PID further comprises a location sensor, allowing the OGIS to provide the appropriate reference image for the DUT based off of the operator's location.

In a related alternative embodiment, the location sensor can utilize a global positioning system (GPS).

In an alternative embodiment, while the method initiates a live image acquisition, it may further comprise conducting an Optical Character Recognition (OCR). The system can utilize the OCR and compare it to an existing library to conduct an Optical Character Verification (OCV), which can then generate a font file. An alignment of the reference image to the image capture of the DUT is automatically generated from the font file. This allows for additional calibration input.

In one embodiment, the method further comprises the step of automatically expanding the area of interest and displaying inspection results and graphics enabling the operator to view the critical area more easily and in better detail than possible with the naked eye.

In one embodiment, the method further comprises the step of providing dynamic calibration by adjusting the pixel-level to the real-world on a real-time basis, as the PID is moved.

In one embodiment, the method further comprises the step of transmitting the results to an external data base or control system that is part of the OGIS.

In one embodiment, notification to the operator includes an audible cue.

In one embodiment, notification to the operator includes a visual cue.

In one embodiment, notification to the operator includes a hpatic cue, such as vibration.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

BRIEF DESCRIPTION OF THE DRAWINGS

The present invention is illustrated with 10 drawings on 10 sheets. A clear understanding of the key features of the invention summarized above may be had by reference to the appended drawings, which illustrate the device, system, and method of the invention, although it will be understood that such drawings depict preferred embodiments of the invention and, therefore, are not to be considered as limiting its scope with regard to other embodiments which the invention suggests. Accordingly.

DETAILED DESCRIPTION OF THE DRAWINGS

Figure 1:
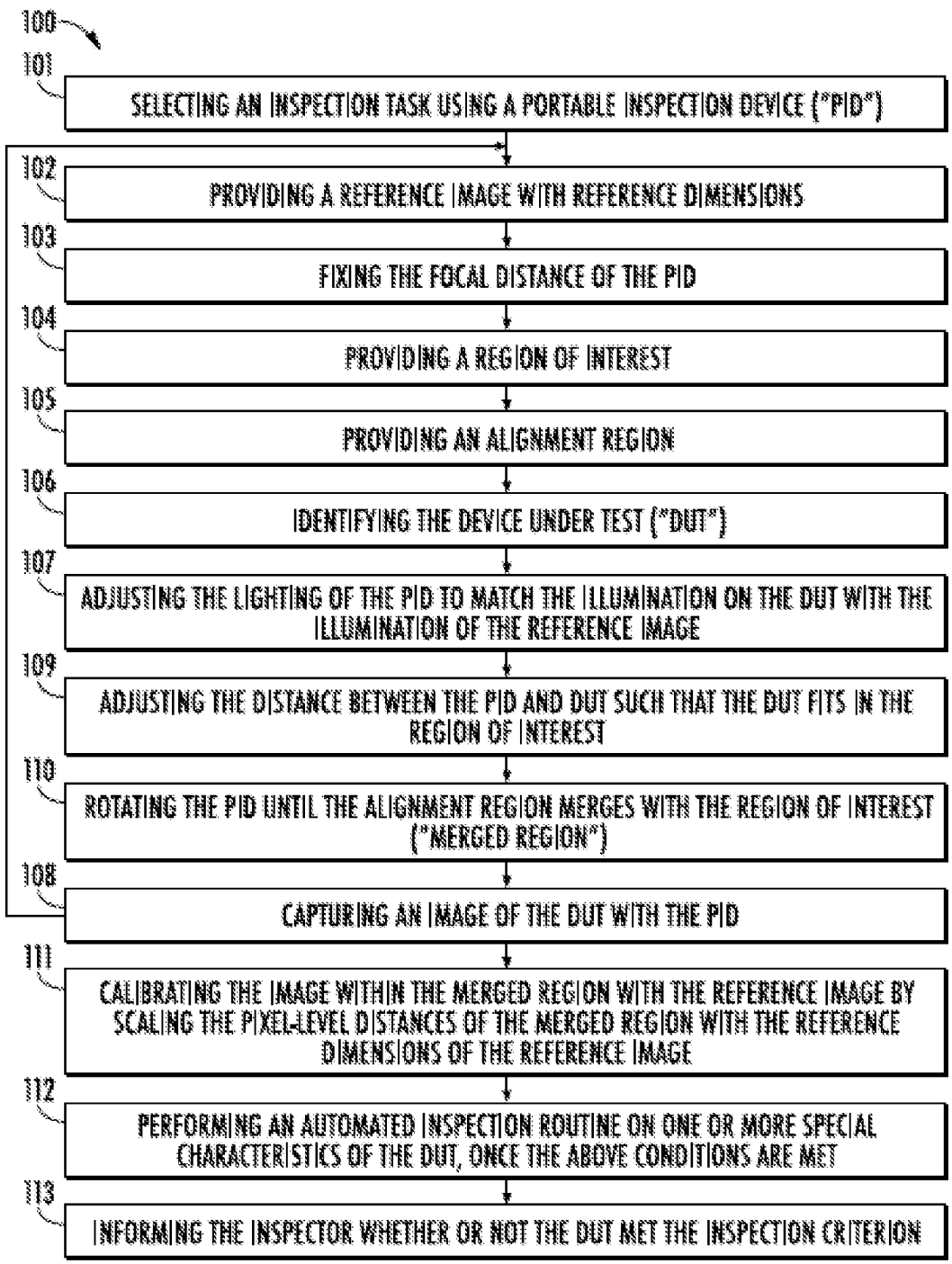
FIG. 1 shows a flow-chart of the method embodiment of the invention.

Unfortunately, many times the current state of the art general machine vision system described in the background is unable to access an assembly to gain the view of the DUT required for the inspection. A robot mounted camera could access some of these areas. But a robot actuator is an expensive, complex and space consuming solution. Additionally, unanticipated variation in location and orientation of the DUT to be inspected would be difficult for a robot to handle. These hard to reach places and highly variable product positions can sometimes be reached with a handheld device under the guidance of an operator. However, it can be difficult for an operator to repeatably achieve the proper orientation of the handheld device in order to make a proper inspection. Therefore, the present disclosure discusses methods for an operator to achieve proper orientation with a hand-held, portable machine vision device and make a successful inspection of a DUT with it.

The present invention includes a PID 1 used for operator guided inspection, a method 100 used for operator guided inspection, and an OGIS 180, resident on an OGIS server 306 and used in conjunction with a plurality of PID 1 and the method 100. The present invention uses a PID 1 to run a method 100 for automatically measuring special characteristics of DUTs. The method 100 is stored as a computer-readable instruction set on a non-transitory, computer-readable medium 302, such as a memory 302, accessible to the PID 1

The PID 1 is intended for use in a manufacturing environment, looking for special characteristics. Specifically, the PID 1 is intended for quality control applications such as faulty installation of components in complex systems, such as automobiles, aircraft and MRIs. An example of this type of application is detecting soft-seated electrical connectors in automobiles, aircraft, and MRIs. Soft-seated connectors can vibrate loose and create safety and operational issues. Often these connectors are behind other components and not secured to a rigid mount making it impossible to use a fixed camera inspection system. Anecdotal data suggests that soft-seated connectors is the largest single fault in modern manufacturing, as measured by warranty cost.

The present invention can also be used for error proofing labeling, such as chemical and food containers. Containers are moved and placed by forklifts and are not accurately located or orientated, making it impossible to inspect with a fixed camera system. The PID 1 and OGIS 180 gives the operator 1000 the ability to adjust to a non-fixtured inspection target. The PID 1 could be valuable anywhere manual inspections are being performed. The PID 1 used in conjunction with the method 100 and OGIS 306 as taught by this application provides machine vision based automated inspection in areas that would not be possible with fixed mount machine vision systems. The OGIS 306 also provides archived images and data records of the as-built or as-shipped products.

Referring to FIGS. 2-5 and 8, the PID 1 is a hand-held, fully portable device 1 comprising a housing 6; a processor 301; a non-transitory, computer-readable memory 302; a computer-readable instruction set, executable by the processor 301, stored on the non-transitory, computer readable memory 302; a camera 401 with a focal length controllable by the processor 301; a programmable light array 402; a display 3, an input 303 such as a camera 501; graphic user interface 233; a wireless communications chipset 305 to interface to the OGIS server 306, the ERP, and other planning and control systems; and location sensor 599 such as a GPS chipset and/or motion sensors 509 such as a gyro. The operator 1000 can use the camera 401 to acquire an image by pressing a button, using the graphic user interface, or with voice commands.

Figure 2:
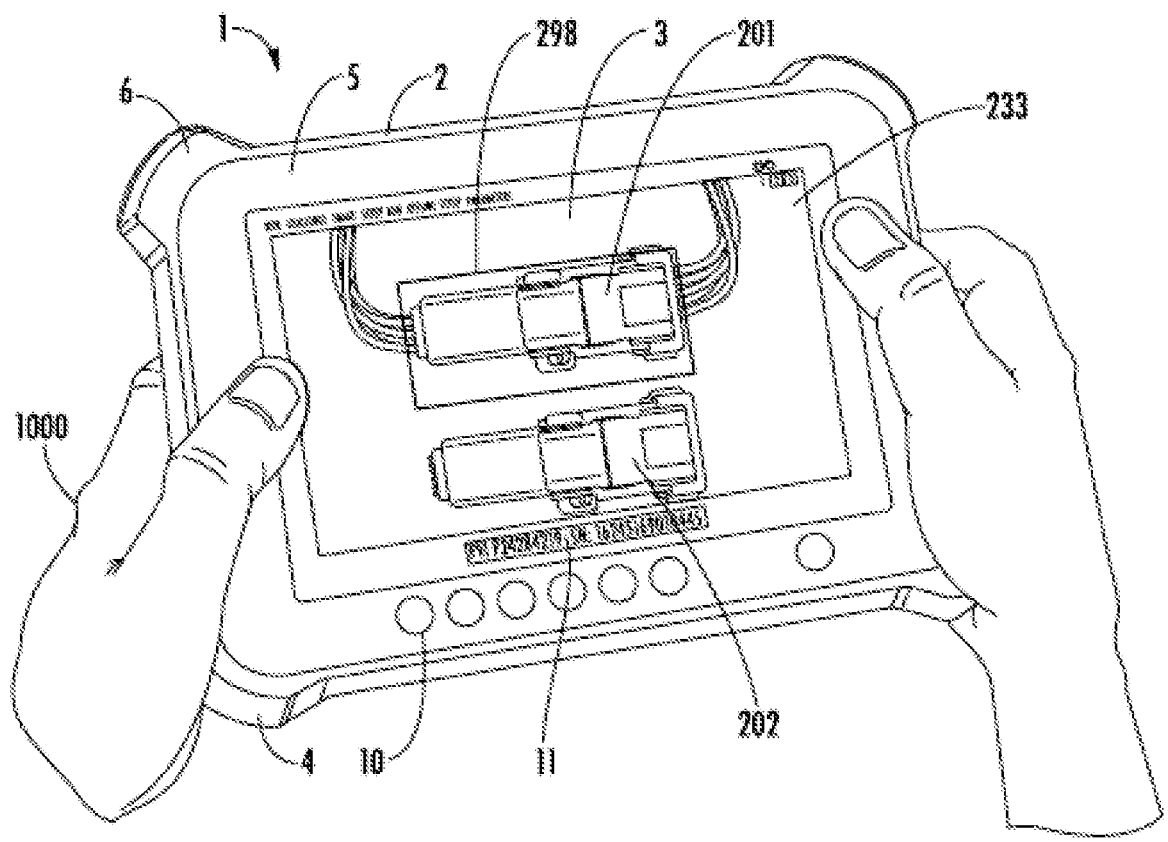
FIG. 2 shows a front-perspective view of a PID.

FIG. 2 shows a front-view of the PID 1. The PID 1 is hand-held by a operator 1000, sometimes referred to as an inspector 1000. The PID 1 has a housing 6, display 3, and, optionally, a plurality of hard-keys 10. The case 6 is molded from plastic and has ears 4 connected by longitudinal members 2. The case 6 holds and protects an electronic device. The electronic device has a bezel 5, hard-keys 10, and a display 3. Referring to FIGS. 2 and 8, on the display 3, a graphic user interface ("GUI") 233 shows a DUT 201, a reference image 202, and a Merged Region 298.

Figure 3:
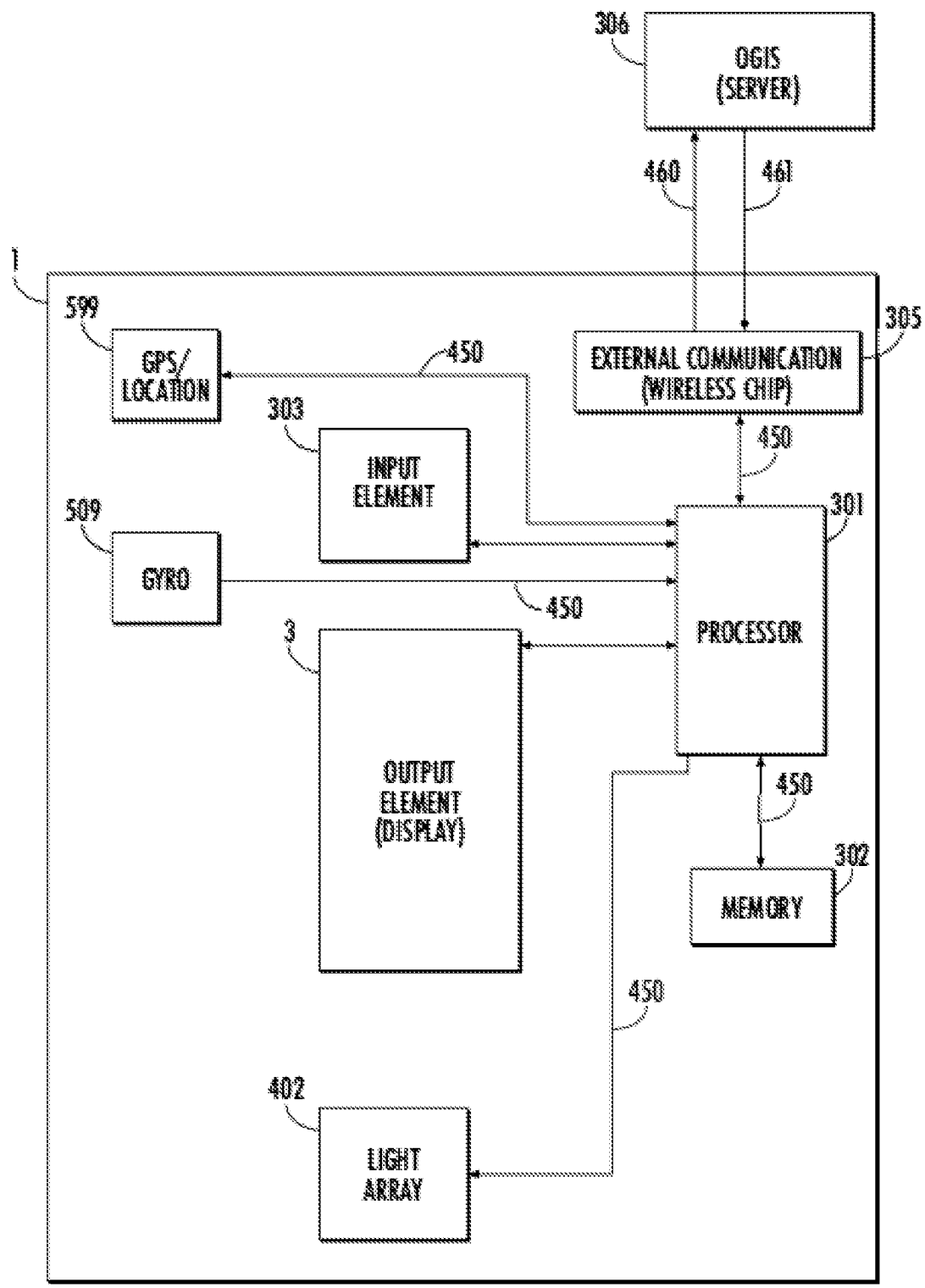
FIG. 3 shows a network diagram of a PID interacting with an OGIS.

FIG. 3 shows a network diagram of the PID 1. The PID 1 has a processor 301; a non-transitory, computer-readable memory element 302; a chipset for external communication 305, such as a wi-fi chipset; a display 3; a camera 401; a gyro 509; a location sensor 599, such as a GPS chipset; and a light array 402. Data flows 450 between the processor 301 and the memory 302, light array 402, external communication chipset 305, location sensor 599, and gyro 509. The gyro 509 may be used to provide haptic feedback to the user. The location sensor 599 may be used to provide the operator input as to which DUT should be measured. The PID 1 can communicate with the OGIS server 306 through a two-way data flow 461, 460 from the external communication chipset 305.

Figure 4:
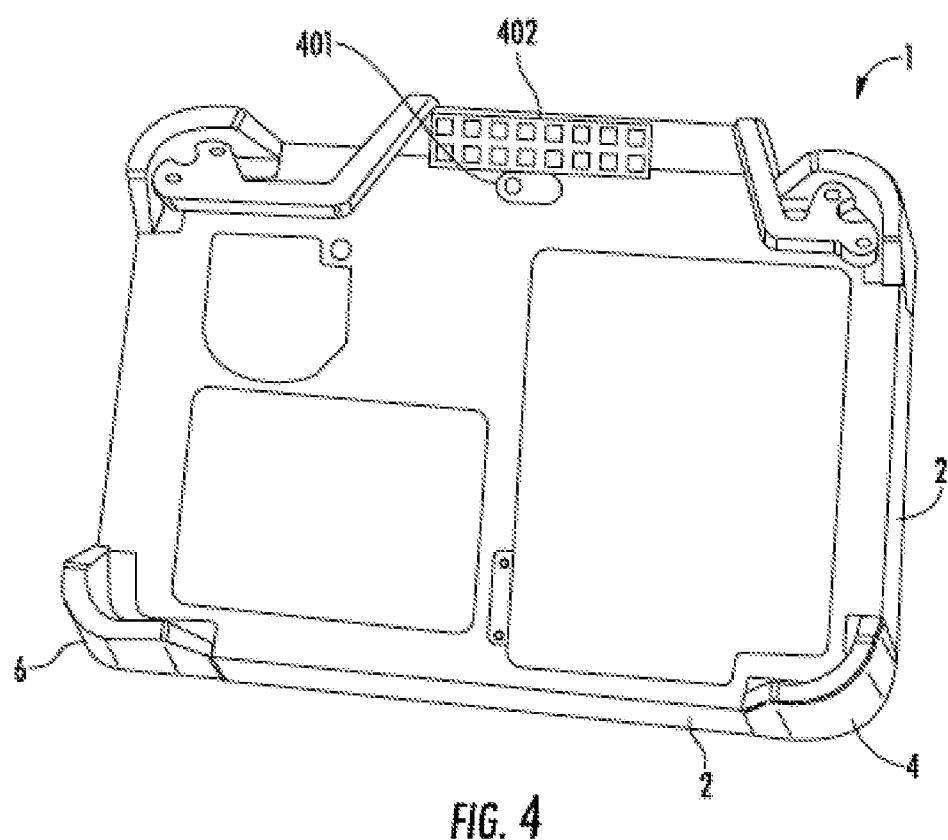
FIG. 4 shows a back-perspective view of a PID.

FIG. 4 shows a back-view of the PID 1. The PID 1 has a camera 401 and a light array 402. The light array 402 is made up of a plurality of lighting elements, such as LEDs 402, that can individually energized by the processor 301. Also visible in this view are the case 6 showing the corner ears 4 and connecting longitudinal members 2.

Figure 5:
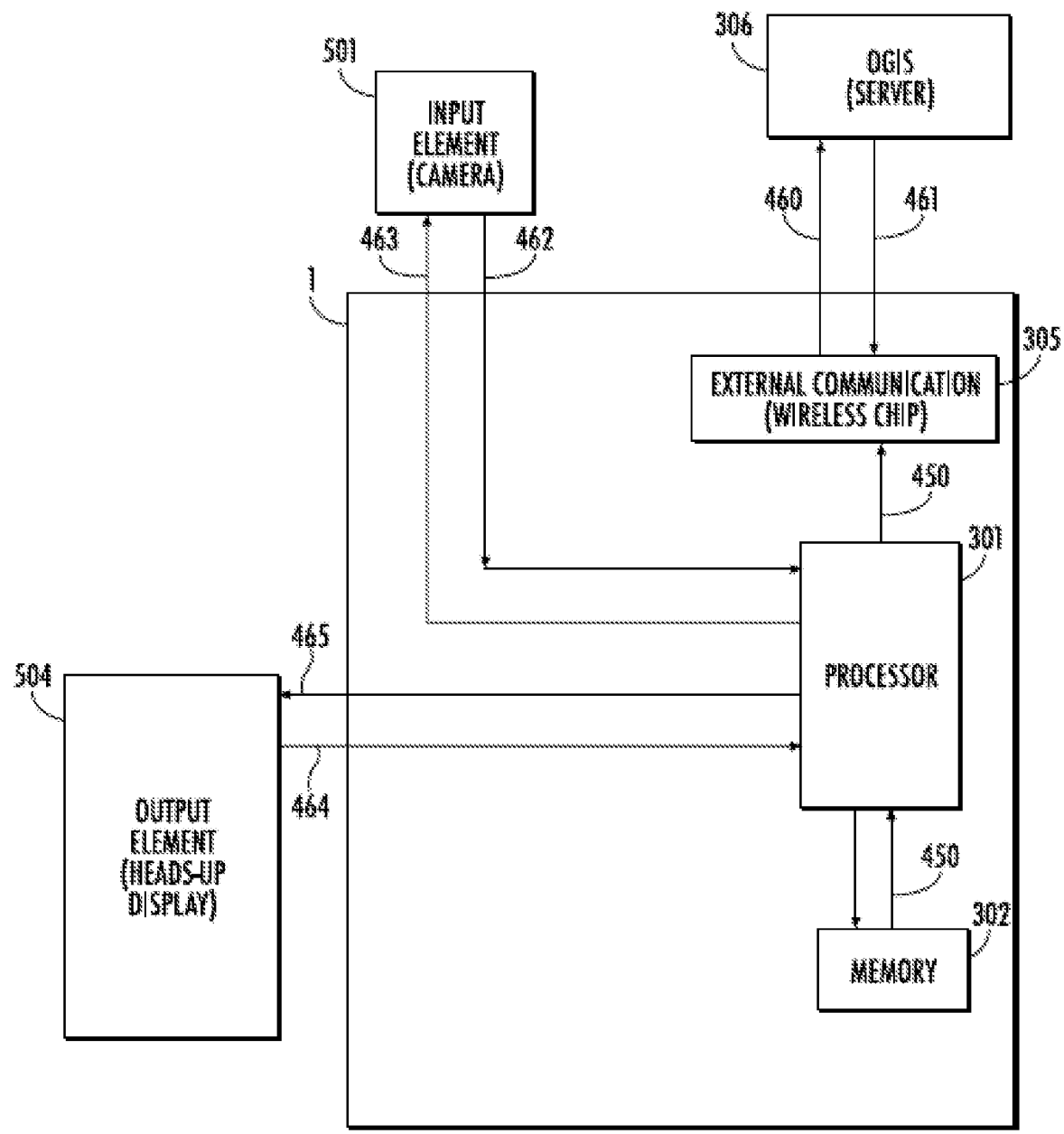
FIG. 5 shows a network diagram of a PID interacting with an OGIS, while using a remote input device such as a camera and a remote output device such as a heads-up display.
Figure 6:
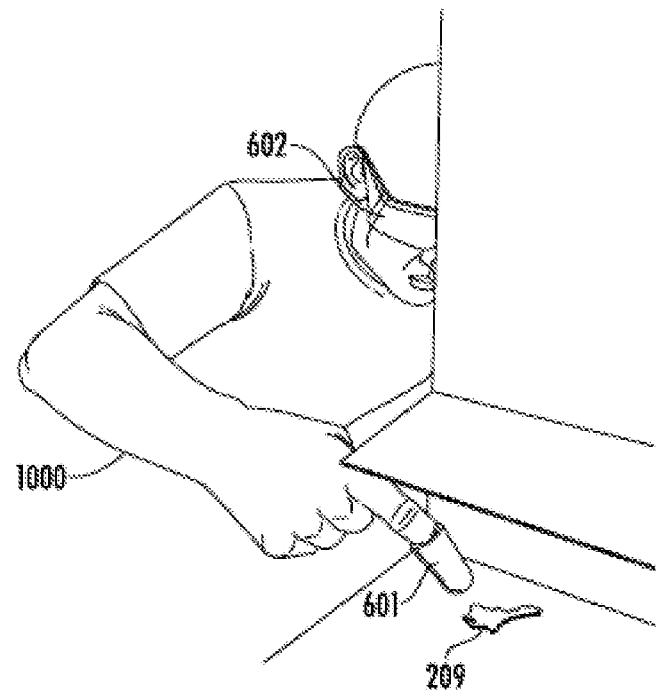
FIG. 6 shows a fingertip remote input device used with goggles containing a heads-up display as the output device.
Figure 7:
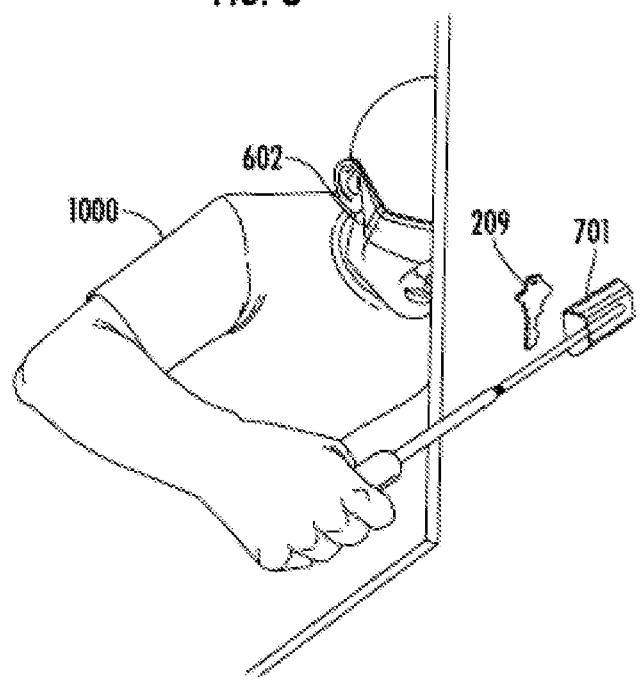
FIG. 7 shows a wand remote input device used with goggles containing a heads-up display as the output device.

FIGS. 5-7 show alternative embodiments of the PID 1. In FIG. 5, there is a network diagram for an alternative embodiment of the PID 1. The PID 1 has a processor 301, a non-transitory, computer-readable memory 302, and communication chipset 305. The processor 301 communicates internally 450 with the memory 302 and communications chip 305. The PID 1 communicates 464, 465 with an output element 504, such as a heads-up display 602 built into a set of goggles 602. The PID 1 also communicates 462, 463 with an input element 501 such as a wand mounted 701 or finger-tip mounted 601 camera.

FIG. 6 shows an alternative embodiment of the PID 1 wherein the input device 501 is a finger-tip mounted camera 601, which can find obscure DUTs 209. The finger-tip mounted camera 601 uses a glove, brace, or thimble. In this embodiment of the PID 1 the display and processor are part of a wearable heads-up display 602 contained in a set of goggles 602. Inspection feedback, actual position and camera position are presented to the operator in an augmented-reality image.

FIG. 7 shows an alternative embodiment of the PID 1 wherein the input device 501 is a wand 701, which can find obscure DUTs 209. In this embodiment of the PID 1 the display and processor are part of a wearable heads-up display 602, contained in a set of goggles 602. Inspection feedback, actual position and camera position are presented to the operator in an augmented-reality image.

Figure 8A:
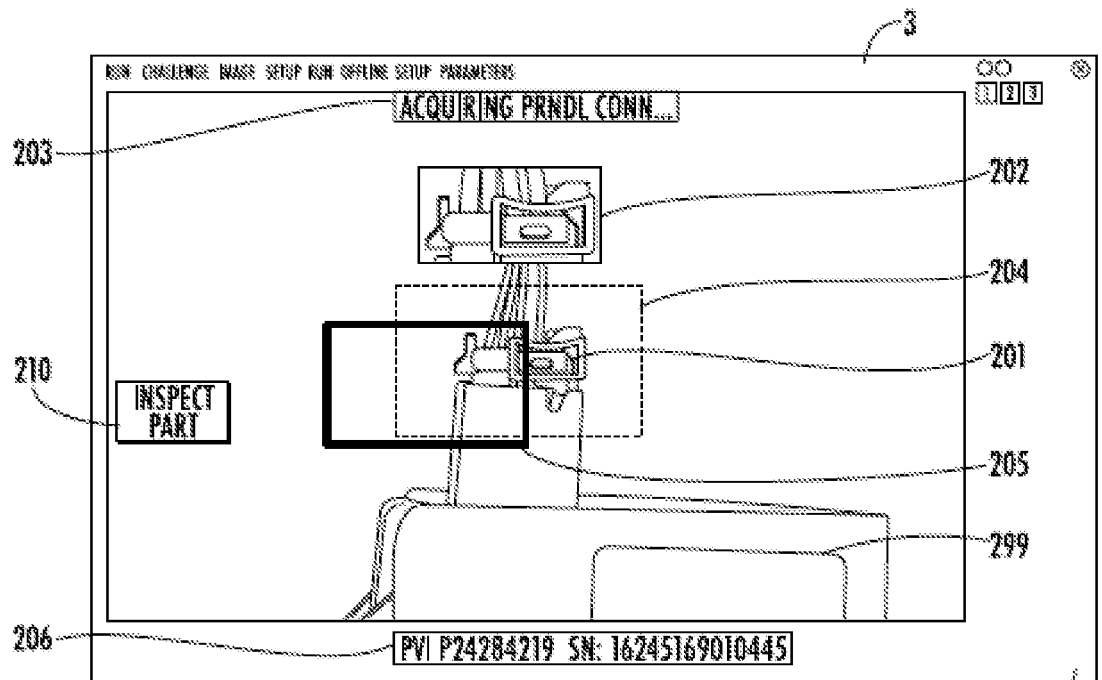
FIG. 8A is a front view of the display of the PID, showing the ROI and AR.

FIGS. 8A, 8B, 9A, and 9B show various aspects of the GUI 233. The GUI 233 is shown on the display 3. In FIG. 8A, the reference image 202 is shown above the DUT 201, allowing an operator 1000 to discriminate between the DUT 201 and the larger assembly 299. Alternatively, the reference image 202 can be shown on the GUI 233 below the DUT 201. In this view, the DUT 201 is within the ROI 204. The AR 205 provides the operator 1000 feedback on how the PID 1 should be rotated 110 in order to merge the AR 205 and ROI 204. The GUI 233 provides the part name and action 203 and the part number and S/N 206.

Figure 8B:
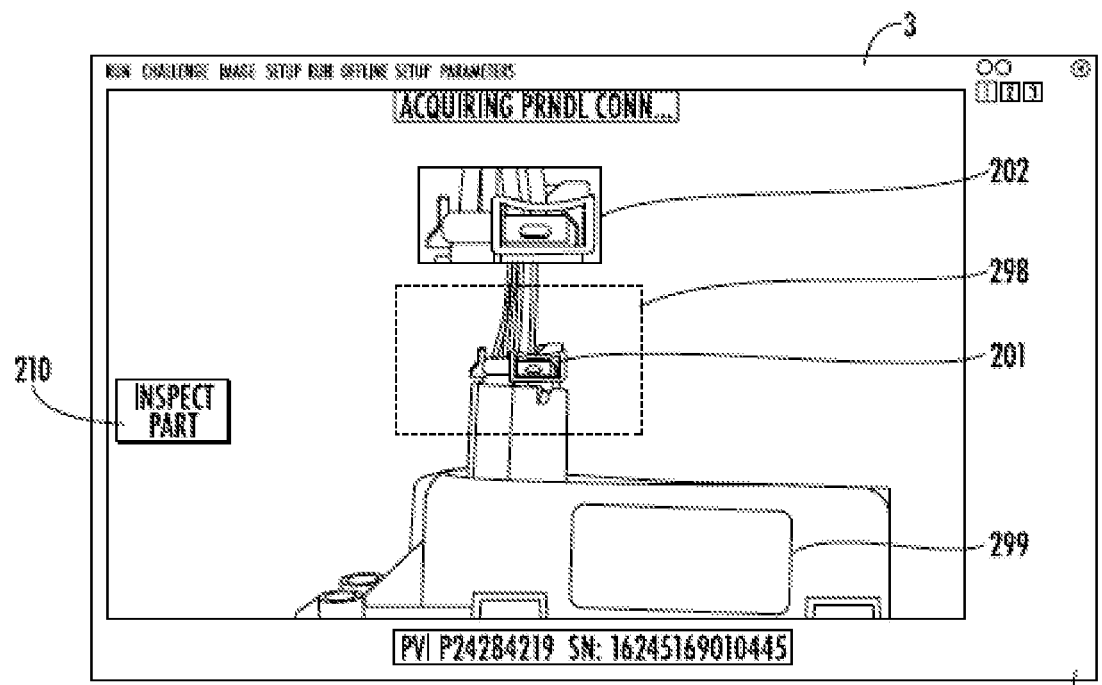
FIG. 8B is a front view of the display of the PID, showing the Merged Region.

FIG. 8B shows the Merged Region 298, which results from the ROI 204 merging with the AR 205. The remainder of the GUI 233 remains largely the same. Once the DUT 201 is within the Merged Region 298, the operator 1000 can hit the soft-key 210 to automatically inspect 112 the DUT 201.

Figure 9A:
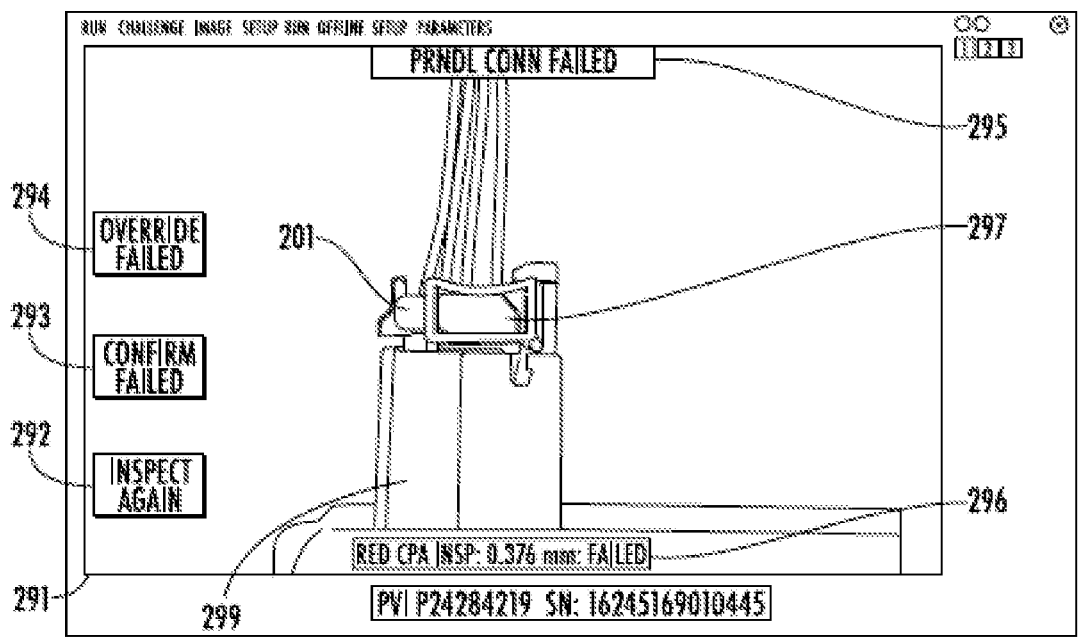
FIG. 9A is a front view of the display of the PID, showing an embodiment of a failed-part screen.

FIG. 9A shows the GUI 233 after the automatic inspection 112 of a DUT 201 results in a failed part. The DUT 201 has a visual indicator that is too close to the frame 297. The GUI 233 is informing 113 the operator 1000, sometimes referred to as an inspector, that the DUT 201 has failed inspection. In this embodiment, the GUI 233 gives three signals that the part failed: a top banner 295; a bottom banner 296, and a red-colored border 291. Clearly, the GUI 233 can be tailored to provide many different types of failure notifications. The GUI 233 provides disposition soft-keys 294, 293, 292, allowing the operator 1000 to override the failure 294, confirm the failure 293, or inspect the part again 292. For example, the operator 1000 can remedy the problem and then re-inspect 292 the DUT 201.

Figure 9B:
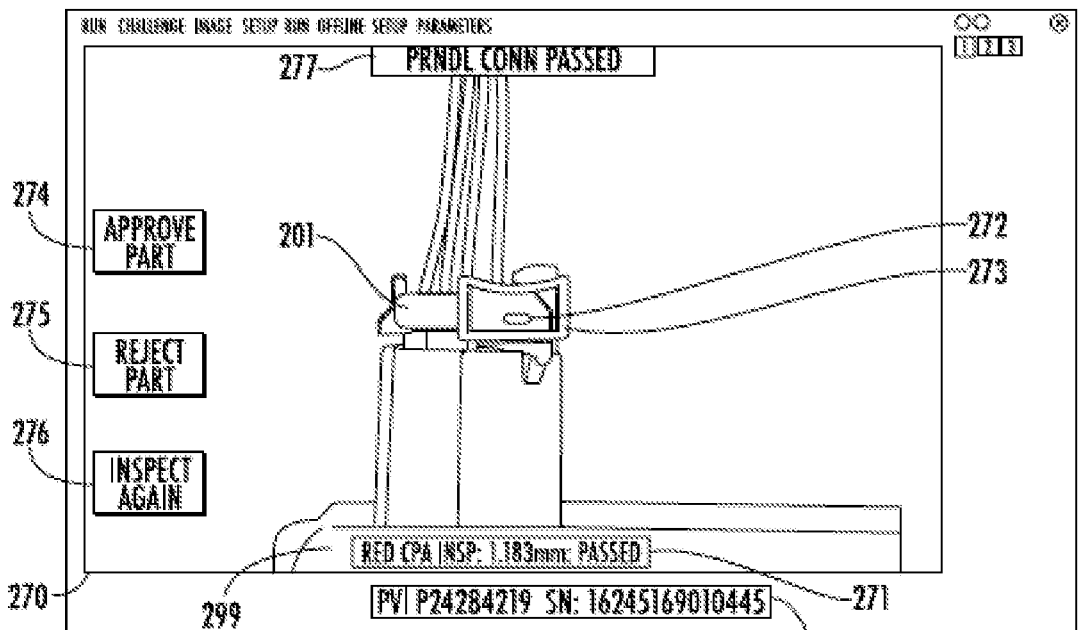
FIG. 9B is a front view of the display of the PID, showing an embodiment of a passed-part screen.

FIG. 9B shows a passing DUT 201. The visual indicator 272 is the appropriate distance from the frame 273. The GUI 233 gives three signals that the part passed: a top banner 277; a bottom banner 271, and a green-colored border 270. Clearly, the GUI 233 can be tailored to provide many different types of failure notifications. The GUI 233 provides disposition soft-keys 274, 275, 276, allowing the operator 1000 to approve the part 274, reject the part 275, or inspect the part again 276.

Figure 10:
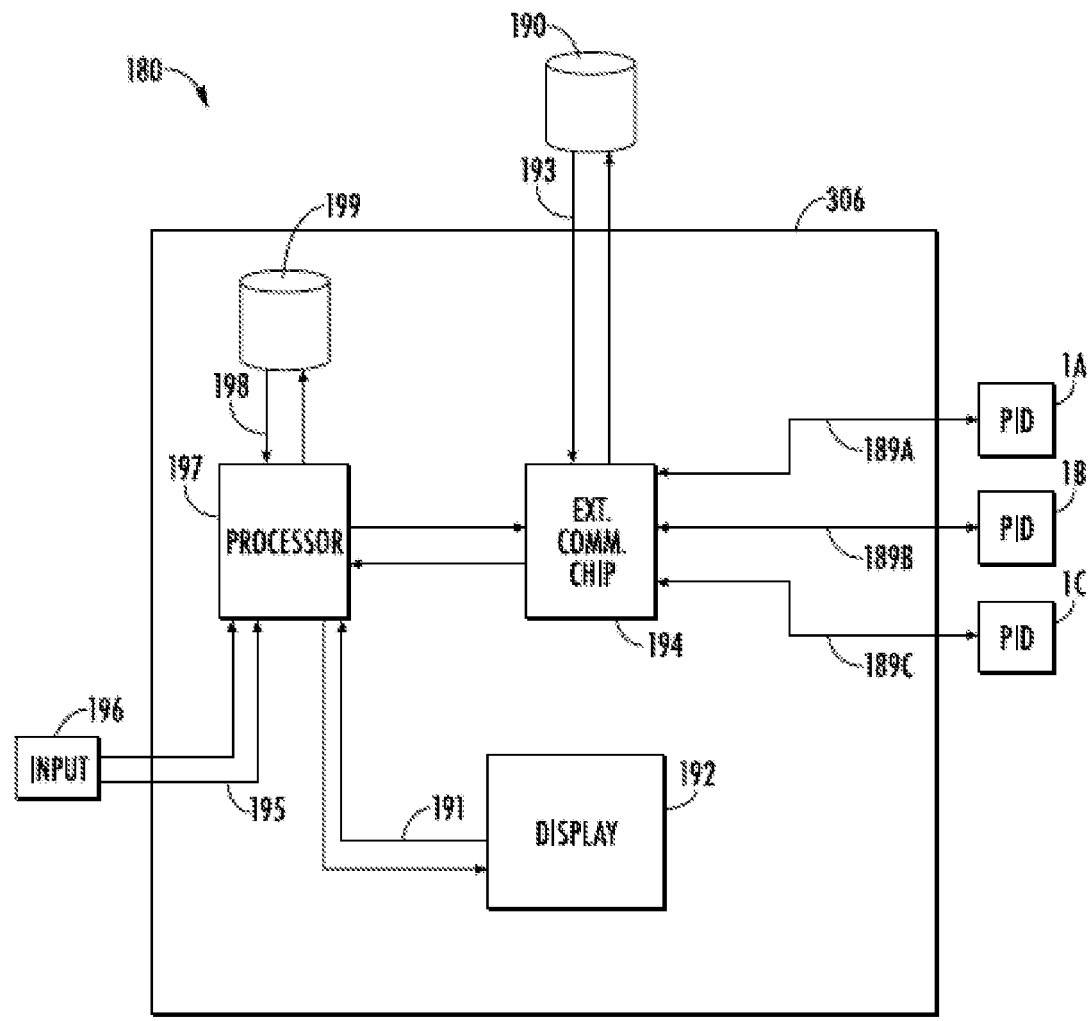
FIG. 10 shows a network diagram of the OGIS.

FIG. 10 shows the OGIS 180, including the OGIS server 306. The OGIS server 306 is comprised of a processor 197, a database 199, an external communication chipset 194, an input 196, and a display 192. The database 199 is a memory element constructed from a non-transitory, computer-readable medium and on which data may be stored in a non-transitory, computer-readable fashion. The data so stored may include, but is not limited to, non-transitory, computer-readable instruction sets; reference images 202; metadata associated with the reference images 202; login credentials; parts lists; and results from automatically inspecting 112, 113 a plurality of DUT-N. The reference images 202 are associated with a part number. The metadata associated with the reference images 202 includes, but is not limited to, dimensions, tolerances, and pass/fail criterion for special characteristics related to the DUT 201; the location at which the special characteristic of a DUT is supposed to be measured; and the focal length at which to fix 103 the camera 401, 601, 701.

The OGIS 180 works in conjunction with a plurality, X, of PIDs 1A, 1B, 1C. X is an integer number of PIDs 1 interoperating with the OGIS 180. In the example in FIG. 10, X=3 as there are three PIDs 1A, 1B, 1C. The OGIS 180 assigns each PID-X at least one DUT-N to inspect, N being greater than or equal to X. Clearly, a plurality of operators 1000 numbering X is required to use the X number of PIDs 1, where an operator 1000 is defined as a person using a PID 1 to inspect a DUT 201. The OGIS 180 communicates 189A, 189B, 189C with the plurality of PIDs 1A, 1B, 1C through an external communication chipset 194. A PID 1 selects an inspection task 101 by entering a part number, taking a picture with the camera 401, 601, 701, or being at a specific location. The OGIS 180 can request data 193 from an external database 190, such as an enterprise resource planning ("ERP") or material resource planning ("MRP") system. The external database 190 is a non-transitory, computer-readable medium.

The PID 1 is provided 102 a reference image 202 by the OGIS server 306. The OGIS server 306 also transmits the metadata relevant to the inspection of the DUT 201 by the PID 1.

Referring to FIG. 1, the method 100 works in conjunction with the PID 1 and OGIS 180. The method 100 performs the following steps: selecting an inspection task using a PID 101; capturing an image of the DUT with the camera 108; providing a reference image with reference dimensions 102; fixing the focal distance on the camera 103; providing a ROI on the display of the PID 104; providing an AR on the display of the PID 105; identifying the DUT 106; adjusting the lighting of the PID to match the illumination on the DUT with the illumination in the reference image 107; adjusting the distance between the PID and the DUT such that the DUT fits in the ROI 109; rotating the PID until the ROI and AR merge into a Merged Region 110; calibrating the Merged Region with the reference image by scaling the pixel-level distances of the Merged Region with the reference dimensions of the reference image 111; performing an automated inspection routine on one or more special characteristics of the DUT, once the above conditions are met 112; and informing the operator, sometimes called an inspector, whether or not the DUT met the inspection criterion 113. Some of the steps may be interchanged with one another without changing the invention disclosed by this application. Some of the steps may also be iterated.

Referring now also to FIGS. 2 and 8-9, the graphic user interface (GUI) 233 acts as the operator 1000 interface with the process 100. The GUI 233 is projected onto the display 3 of the PID 1. Once the task is selected 101 and confirmed by the operator 1000, the method 100 captures 108 a live image from the camera 401 and projects it on the display 3 as part of the GUI 233. A reference image 202 is provided 102 by downloading it from the OGIS 306. A live image of the DUT 201 is shown in near proximity to the reference image 202, in this case, right below the reference image 202. The focal length of the camera is fixed 103 based on the reference image 202.

The camera 401 in the PID 1 used to capture the image 108 uses at least one of the spectra of visible light, x-ray, and infrared. The spectrum can be analyzed by hyperspectral imaging. The spectrum can be imaged 108 into two-dimensions or three dimensions. A three-dimensional image can be created using at least one of time-of-flight, structured lighting, stereo, radar, and lidar.

A ROI 204 and AR 205 are provided 104, 105 on the display 3 by the GUI 233. The reference image 202 allows an operator 1000 to quickly isolate and identify 106 the DUT 201 from the larger assembly 299. The method 100 adjusts the lighting 107 of the PID 1 to match that of the reference image 201. The individual lighting elements of the light array 402 may be separately energized by the processor 301, based off of the lighting in the reference image 201. The frequency (color) and location of the individual lighting elements of the light array 402 may be selected to enhance the physical characteristics of the DUT 201. The fixed focal length 103 forces the operator 1000 to adjust the distance 109 between the PID 1 and the DUT 201 in order to get a properly sized and focused image within the ROI 204. The operator 1000 rotates 110 the PID 1 until the ROI 204 and AR 205 merge in a Merged Region 298.

The method 100 then calibrates 110 the image of the DUT 201 within the Merged Region 298. The calibration 110 is performed by scaling the pixel-level distances in the Merged Region 298 with the reference dimensions contained in the metadata of the reference image 202. Although this is not an absolute calibration, it has more than sufficient sensitivity for the inspection purposes for which this invention 1, 180, 100 is intended.

Once the operator 1000 has the DUT 201 within the Merged Region 298, the operator 1000 may hit a soft-key 210 on the GUI 233 to perform an automated inspection routine 112. When the routine is finished, the GUI 233 on the PID 1 informs the operator 1000 whether the DUT 201 met the inspection criterion or not. In FIG. 9B, if the operator 1000 is informed 113 that the DUT passes the automatic inspection routine 112, the operator 1000 may hit the approve part 274 soft-key on the GUI 233, at which point the PID 1 transmits the data collected about the DUT 201 to the OGIS server 306 for storage.

All soft-keys 210, 274, 275, 276, 292, 293, 294 can be customized as part of the GUI 233 to make it easy and obvious for a operator 1000 to navigate through the inspection sequence.

Referring to FIGS. 1 and 3, the method 100 may use the gyro 509 to provide feedback to the operator 1000 about the orientation of the PID 1 and may project rotational directions onto the display 3. The gyro 509 may be excited by the processor 301 to provide the operator 1000 haptic feedback concerning the rotational orientation of the PID 1 with respect to the DUT 201. The method 100 may use the location sensor 599, such as a GPS chipset 599. to provide the operator 1000 with information concerning which DUT from the DUT-N should be inspected. The OGIS 180 may provide the PID 1 with a reference image 202 related to a particular DUT 201 based on the location of the location sensor 599.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations, and broad equivalent arrangements.

We claim:

1. A portable inspection device ("PID") comprised of
   a housing;
   a camera with a controllable focal length;
   a display;
   a non-transitory, computer-readable memory;
   a computer-readable instruction set, stored on the non-transitory, computer-readable memory; and
   a processor;
   wherein the computer-readable instruction set, when executed by the processor, guides an operator to hold the PID in the correct spatial location, with the correct orientation, to inspect a device, called a device under test ("DUT"), that is being inspected by the PID, by
      projecting a reference image on the DUT,
      fixing the focal length of the camera,
      capturing an image of the DUT,
      projecting the image of the DUT on the display in near proximity to the reference image,
      projecting a region of interest ("ROI") onto the display,
      projecting an alignment region ("AR") onto the display, and
      guiding the operator to
         hold the PID at the correct distance from the DUT so that the DUT is within the ROI; and
         rotate the PID to merge the AR with the ROI.

2. The PID of claim 1, further comprising a programmable light array containing a plurality of light elements which can be individually energized.

3. The PID of claim 2 wherein the computer-readable instruction set, when executed by the processor, individually energizes light elements of the programmable light array in order to match the lighting of the DUT with the lighting of the reference image.

4. The PID of claim 1 further comprising a gyro.

5. The PID of claim 4, wherein the gyro gives the operator haptic feedback about the correct rotational orientation of the PID.

6. The PID of claim 1 further comprising a location sensor.

7. The PID of claim 6 wherein the location sensor is a GPS chipset.

8. The PID of claim 6 wherein the computer-readable instruction set provides the operator with information about the DUT based off of the location information from the location sensor.

9. The PID of claim 1 wherein the display is contained in a set of goggles as a heads-up display.

10. The PID of claim 9 wherein the camera is contained in a wand.

11. The PID of claim 9 wherein the camera is incorporated into the finger-tip in a pair of gloves.

12. An operator guided inspection system ("OGIS") comprising
   an OGIS server comprising
      a processor,
      a non-transitory, computer-readable memory called a database,
      an OGIS computer-readable instruction set stored on the database, and
      an external communication chipset;
   a plurality of portable inspection devices, called "PIDs", wherein each PID is comprised of
      a housing,
      a camera with a controllable focal length,
      a display,
      an input,
      a non-transitory, computer-readable memory,
      a PID computer-readable instruction set, stored on the non-transitory, computer-readable memory,
      a processor,
      a light array, and
      an external communication chipset;
   an assembly containing a plurality of devices to be inspected and tested, called devices under test or "DUTs"; and
   a plurality of operators;
   wherein the OGIS server transmits a first reference image containing metadata to a first PID related to a first DUT;
   wherein the first PID guides a first operator through an automatic inspection of at least one special characteristic on the first DUT using the first reference image by
      providing the first operator visual cues to hold the first PID at the correct distance, with the correct spatial orientation, from the first DUT;

adjusting the light array so that the lighting on the first DUT matches the lighting on the first reference image;
capturing an image of the first DUT;
scaling the pixel-level dimensions of the captured image of the first DUT to dimensions contained in the metadata associated with the first reference image; and
inspecting, automatically, the dimensions related to at least one special characteristic of the first DUT.

13. The OGIS of claim 12 wherein the OGIS transmits the first reference image to the first PID related to the first DUT based on input received from the first PID.

14. The OGIS of claim 13 wherein the input received from the first PID is data concerning the location of the first PID.

15. The OGIS of claim 13 wherein the input received from the first PID is an image of a bar code.

16. The OGIS of claim 13 wherein the input received from the first PID is an image of the part number of the first DUT.

17. The OGIS of claim 13, wherein the first PID transmits data about the automatic inspection of the at least one special characteristic of the first DUT to the OGIS; and wherein the OGIS stores the received data in its database.

18. The OGIS of claim 17, wherein the first PID may accept the first DUT.

19. The OGIS of claim 17, wherein the first PID may reject the first DUT.

20. The OGIS of claim 17, wherein the OGIS may accept or reject the assembly based off of the data about the automatic inspection data of at least one special characteristic of the first DUT communicated to the OGIS by the first PID.

21. The OGIS of claim 17, wherein the plurality of PIDs numbers X, wherein X is a positive integer; wherein the plurality of operators numbers X, wherein X is the same positive integer as the number of PIDs; and wherein the plurality of DUTs is N, wherein N is greater than or equal to X.

22. The OGIS of claim 21, wherein each PID is assigned to an operator and assigned at least one DUT to inspect, so that all DUTs of an assembly are inspected,
wherein the OGIS server transmits to each PID a first reference image, containing metadata, related to the first assigned DUT from the at least one DUT assigned to that respective PID;
wherein each PID guides its assigned operator through an automatic inspection of at least one special characteristic for its first assigned DUT using the first reference image related to that first assigned DUT by
providing the assigned operator visual cues to hold the assigned PID at the correct distance, with the correct spatial orientation, from the first assigned DUT;
adjusting the light array so that the lighting on the first assigned DUT matches the lighting on the first reference image related to the first assigned DUT;
capturing an image of the first assigned DUT;
scaling the pixel-level dimensions of the captured image of the first assigned DUT to dimensions contained in the metadata associated with the first reference image;
inspecting, automatically, the dimensions related to at least one special characteristic of the first assigned DUT; and
incrementing the respective PID, if necessary, to inspect another DUT out of the at least one DUTs assigned to the that respective PID.

23. A method for operator guided inspection using a portable inspection device, called a "PID" comprising the steps of using a PID with a camera having a controllable focal length, a display, a light array, and an input;
selecting an inspection task using the PID;
providing a reference image with associated metadata on the display of the PID;
fixing the focal length of the camera;
providing a region of interest ("ROI") on a display of the PID;
providing an alignment region ("AR") on the display of the PID;
identifying with the PID a device to be inspected and tested called a "DUT";
adjusting the lighting of the light array so that the illumination of the DUT matches the illumination of the reference image;
capturing an image of the DUT with the camera;
adjusting the distance between the PID and DUT such that the DUT fits in the ROI; and
rotating the PID until the AR merges with the ROI
wherein the PID is comprised of
a housing,
a camera with a controllable focal length,
a display,
an input,
a non-transitory, computer-readable memory,
a PID computer-readable instruction set, stored on the non-transitory, computer-readable memory,
a processor,
a light array, and
an external communication chipset.

24. The method for operator guided inspection using a PID in claim 23 further comprising the step of calibrating the image of the DUT with the reference image by scaling the pixel-level distances of the DUT with the reference dimensions provided by the metadata of the reference image.

25. The method for operator guided inspection using a PID in claim 24 further comprising the steps of performing an automated inspection routine on one or more special characteristics of the DUT and informing the operator whether or not the DUT met the inspection criterion.

* * * * *